United States Patent
Zocca et al.

(10) Patent No.: US 9,430,689 B2
(45) Date of Patent: Aug. 30, 2016

(54) METHOD OF DECODING OPTICAL INFORMATION

(75) Inventors: Rinaldo Zocca, Argelato (IT); Francesco Deppieri, Gambarare di Mira (IT); Antonio Pascarella, Vignola (IT)

(73) Assignee: DATALOGIC IP TECH S.R.L., Calderara di Reno (Bologna) (IT)

(*) Notice: Subject to any disclaimer, the term of this patent is extended or adjusted under 35 U.S.C. 154(b) by 14 days.

(21) Appl. No.: 14/367,308

(22) PCT Filed: Dec. 22, 2011

(86) PCT No.: PCT/IB2011/055897
§ 371 (c)(1),
(2), (4) Date: Jul. 1, 2014

(87) PCT Pub. No.: WO2013/093562
PCT Pub. Date: Jun. 27, 2013

(65) Prior Publication Data
US 2015/0001294 A1    Jan. 1, 2015

(51) Int. Cl.
| G06K 7/10 | (2006.01) |
| G06K 7/14 | (2006.01) |
| G06K 9/03 | (2006.01) |
| G06K 9/62 | (2006.01) |

(52) U.S. Cl.
CPC ......... *G06K 7/1404* (2013.01); *G06K 7/10544* (2013.01); *G06K 9/036* (2013.01); *G06K 9/6262* (2013.01)

(58) Field of Classification Search
CPC .................................................. G06C 7/1404
USPC ......... 235/462.01–462.49, 437, 472.01, 454, 235/455
See application file for complete search history.

(56) References Cited

U.S. PATENT DOCUMENTS

| 6,034,379 A | 3/2000 | Bunte |
| 6,454,168 B1 | 9/2002 | Brandt |
| 6,585,157 B2 | 7/2003 | Brandt |
| 2005/0056699 A1 | 3/2005 | Meier et al. |

FOREIGN PATENT DOCUMENTS

| EP | 2397968 A1 | 12/2011 |
| JP | 63091792 A | 4/1988 |

OTHER PUBLICATIONS

Kumpati S. Narendra et al., "Learning Automata—A Survey," IEEE Transactions on Systems, Man and Cybernetics, IEEE Inc. New York, US, vol. SM-4, Jul. 1, 1974, pp. 323-334.
International Search Report and Written Opinion dated Aug. 31, 2012 for International Application No. PCT/IB2011/055897.

*Primary Examiner* — Daniel Hess
(74) *Attorney, Agent, or Firm* — Duane Morris LLP

(57) ABSTRACT

A method includes identifying a set of functional parameters that are settable for processing the image and a plurality of instances of the set of functional parameters. A different mode for processing this image corresponds to each of these instances. The method includes selecting a determined processing mode for decoding the optical information from the processing modes of a working set of processing modes, and applying this selected processing mode and further comprises associating with each processing mode a respective probability of success. Selecting one of the methods of the working set includes choosing the processing mode with the highest value of probability of success and updating after each application of the selected processing mode, both if the decoding was successful and if the decoding was not successful, the probability of success of each processing mode of the working set, such as to perform adaptive decoding of the optical information.

20 Claims, 6 Drawing Sheets

S = saturated
B = dark

METHOD OF DECODING OPTICAL INFORMATION

BACKGROUND AND SUMMARY OF THE INVENTION

The invention relates to a method for decoding optical information arranged in an image, acquired by an optical information reader.

In particular, the invention relates to a method for accelerating the decoding of optical information, both when the reader is a device of portable type held by an operator and when the reader is of fixed type, and i.e. connected to a resting base the position of which does not vary over time during operation of the reader.

The optical information readers comprise an image acquisition "optical apparatus", i.e. an optoelectronic apparatus provided with an array of photosensitive elements of the CCD or CMOS type, that is able to acquire images of a framed object. A controlling device, for example a microprocessor, is integrated into the optical apparatus, to command the acquisition of images and process said images, in order to extract from such images geometrical features of the object and/or of a framed label or optical information, associated with this object or with this label.

The phrase "optical information" means any graphic representation that constitutes a piece of information, whether it be non-coded or coded.

For example, non-coded optical information may comprise graphic forms that include printed or hand-written characters (letters, numbers, etc) and particular "patterns", such as, for example stamps, logos, signatures, fingerprints, etc and any detectable graphic representation, not only in the field of visible light, but also along the entire spectrum comprised between infrared and ultraviolet.

Encoded optical information may on the other hand comprise an "optical code", i.e. a set of graphic signs placed on a label or directly on a product, by means of which information is associated with a surface divided into white, black or coloured elementary cells, arranged in one or more directions.

Symbologies of various type are known that are associated with an optical code, developed in order to gather significant data from a plurality of different objects. The first symbologies used were linear symbologies, which were thus called because the data of a symbol extend along a single axis or direction by a succession of black bars and white spaces. One example if these types of symbologies are, for example EAN/UPC, CODE 128 and CODE 39. Recently, two-dimensional symbologies have also become affirmed, which encode the data of a two-dimensional surface. Some two-dimensional symbologies, including the most common on the market are PDF-417, QR Code or Aztec. Two-dimensional codes of different symbologies can differ in terms of shape (for example square or rectangular) of the symbology, and/or through the type of data encoding (for example a matrix or stacked barcode arrangement), and/or by the quantity of stored data.

It should be noted that acquiring the image, identifying the optical information in the image and subsequent decoding of this optical information are operations conducted by the controlling device of the optical apparatus that have a different outcome, depending on the value assumed by functional parameters that are associable both with the optical apparatus and with the controlling device, which are settable at the moment of acquisition of an image and of decoding the optical information contained in this image.

Such settable functional parameters can be optical acquisition parameters that are associable with the optical apparatus to improve the acquisition of the image, such as, for example, adjusting focusing, exposition time and lighting intensity. Other functional parameters, which are on the other hand associable with the controlling device, are those that determine the processing mode for processing the image, including the symbology to be used to decode coded optical information. For example, one parameter can be considered to be the type of filtering for the purpose of improving the image, another parameter the localisation position of the optical code inside the image, the type of symbology 1D or 2D to be used, and which specific symbology to choose from the existing symbologies 1D or 2D. A further parameter is, for example the decoding algorithm to be selected for the symbology in question, there existing in fact for the same symbology algorithms that are fast but are not very tolerant of possible deformations and/or damages to the portion of image in which the coded information is arranged and there exist other algorithms that are more complex and slower, which are nevertheless able to analyse coded information even when the latter are arranged in non-ideal acquired images.

The set of the values assumed by such settable functional parameters thus determines the image-processing mode and thus different instances of this set correspond to different processing modes, each specific for a respective application of the optical information reader. For example, a first processing mode will be specific, and thus optimised from the point of view of the time required to decode the encoded optical information, to read a linear symbology arranged centrally in the acquired image, a second processing mode will instead by optimised to read a centrally arranged two-dimensional code, and a third processing mode will be able to read a two-dimensional code arranged in a reflective surface. Nevertheless, one of the increasingly appreciated features in optical information readers is the flexibility of use, i.e. the capacity of decoding optical information in different conditions. For information that is an optical code this flexibility of use means having the possibility of reading several optical codes of different types, for example different optical symbologies, in different environmental conditions, for example when illuminated with differing lighting intensity, with the optical codes arranged in any position in the acquired image, for example centrally or laterally in the image.

Taking into consideration the typical use application of optical information readers, it is noted that the same reader can be used in a totally different manner inside the same application.

If an optical information reader is portable, it is intended to be held by an operator and the acquired images mainly have the optical code in a central position, in which the operator commands a reading after instinctively pointing the reader in such a manner that the optical code is approximately in the centre of the field of view.

The portable readers, can, however, be arranged in a fixed support in "stand mode" for automatic reading, i.e. in which it is the reader that automatically commands reading of the images to be acquired and the objects can be conveyed automatically in front of the reader or be quickly "swiped" by the operator in front of the sensor ("swipe scanner"). In this case, the operator does not need to hold the portable reader and has his hands free. When the portable readers are in "stand mode", the optical code is not always arranged centrally in the acquired image. In fact, the quicker the object is made to move in front of the reader, the more the optical code can be arranged laterally in the acquired image or can even be only partially framed.

Also, the same optical information reader has to be able to read different types of symbologies. In a supermarket for example, in which the reader is positioned in "stand mode" and reads linear EAN/UPC symbologies, it may, for example, be necessary to read an optical 2D code to check the age of a customer buying alcohol. Or, in an airport a reader has to be able to read both a boarding card PDF-417 and an electronic boarding pass received by a passenger in the form of an Aztec Code.

Further, the same optical information reader can be usable by several different operators. The first operator can use the reader to read a first symbology and occasionally a second and a third symbology, the second operator may on the other hand need to read regularly a fourth symbology and only occasionally the second and a fifth symbology.

As a result, a problem that is very much felt in optical information readers is the selection criterion of the processing mode chosen during the work phase of the reader, from processing modes provided a priori for the reader, in order to reduce the time required to read coded information. In certain "unattended" applications in which the type of code is standardised and/or the acquisition modes (distance, lighting, environment) are repetitive, it is known to put before a reading step a learning step in which an expert operator "trains" the reader for example by presenting a series of typical codes/labels and adjusting consequently the settable functional parameters. In this training step the expert user thus adjusts the settable acquisition/control functional parameters, trying to optimise the parameters on the type of training images that are presented to him and thus establishes a priori the possible processing modes corresponding to the preset functional parameters. In this training step a preferred processing mode is also defined. During the work phase, if the preferred processing mode is unsuccessful because optical information is not decoded, for example the optical code is not decoded, the remaining processing modes are used according to a preset order.

On the other hand, in the case of portable readers with non-repetitive reading conditions that and are used by users who are not expert users, the variability in the conditions of use and the impossibility of implementing the acquisition parameters makes the training step disclosed above difficult. In this case, it is known to store in the reader a set of possible processing modes and to associate with said set a preset order of execution of said processing modes from a preferred execution mode. When the reader is in the work phase, all the different possible processing modes are run in succession until the optical code is decoded. The processing mode caused successful decoding of the optical code becomes the preferred processing mode and thus the one that is first applied for the subsequent acquisition of an image. The preset order of execution is maintained.

U.S. Pat. No. 6,454,168 discloses a decoding method of coded information for a portable reader, which provides a training step even in the absence of an expert operator. In a training step of the reader, the controlled device stores which of the selected processing modes has had more success in order to establish an order of execution of the selected processing modes to be used at the end of the training step, i.e. when the reader is in the work phase. The selection criterion of the processing mode is not established a priori but is optimised according to what was learnt during the training step.

It is observed that the order of execution of the processing modes established before the work phase, as disclosed by U.S. Pat. No. 6,454,168, ensures rapid decoding of the most frequent coded information when, for example there is a prevalent symbology but it creates numerous drawbacks when, for example, a portable reader has to decode coded information relating to a plurality of symbologies, all of which are probable in the same manner and which are presented to the reader, in batches, in sequence.

The portable reader will in fact try to decode the coded information by running at each decoding the processing mode according to the preset order and thus attempting in vain, for example, a first and a second processing mode before going on to the third mode, the decoding of which could instead end successfully.

As the optical information reader does not produce a valid result during the decoding attempts, the lengthy processing time is perceived by the user as a slowing in the operation of the reader itself, if the reader is portable.

If, on the other hand, the reader is in "stand mode" and the object is made to transit quickly in front of the reader, the processing time can become greater than this transit time and thus processing may no longer be keeping up with acquisition.

Even if the controlling device is provided with an acquisition buffer for storing the images awaiting processing, few images can be acquired in the short time of transit of the object in front of the reader and significant images can thus be lost that are no longer storable in the acquisition buffer, which prevent decoding of the optical code.

One object of the invention is to overcome defects of known decoding methods.

A further object is to provide a decoding method for coded information that guarantees great acquisition flexibility and at the same time minimises the time required for decoding without a specific training step being required.

Another object is to provide a decoding method that can be advantageously usable for optical information readers intended for applications and uses that can vary over time or from one user to another.

Such objects and also others are all achieved by a decoding method for decoding optical information as defined in one or more of the claims set out below.

BRIEF DESCRIPTION OF THE DRAWINGS

The invention can be better understood and implemented with reference to the attached drawings, which illustrate same embodiments thereof by way of non-limiting example, in which.

DETAILED DESCRIPTION

Figure 1:
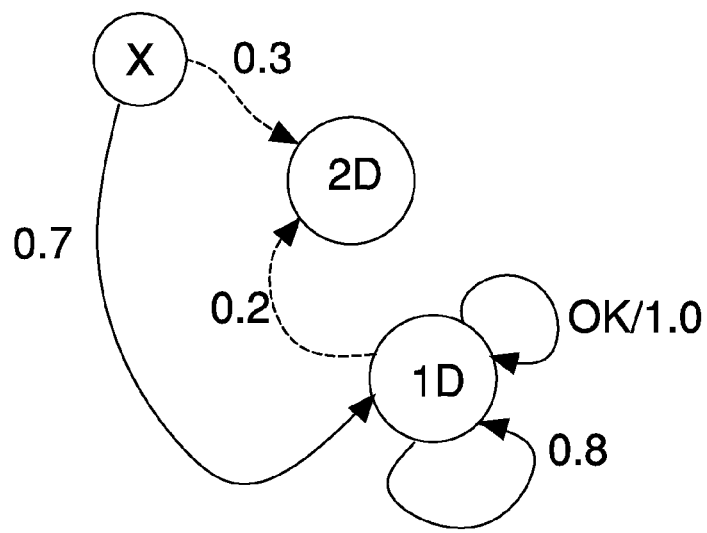
FIG. 1 shows a state diagram that illustrates how from a present (present state) processing mode X the subsequent (future state) processing mode is selected, in relation to the probability of success of the processing modes for the working set, in which each processing mode (state) is represented by a bubble and in which the probability of success of each processing mode is expressed in association with the directed status transition line.

An optical information reader (not shown) comprises a controlling device and an optical apparatus that is controllable by this device, that is able to acquire images of a framed object. The controlling device, for example a microprocessor, is integrated into the optical apparatus, to command the acquisition of images and the processing of such images.

For this reader, it is possible to define a set of settable functional parameters, which can be associated both with the optical apparatus and with the controlling device. Subsequently, and only by way of example, some of these settable parameters and the correlation between the value assumed by these settable parameters and the consequent effect on the image processing mode will be illustrated. These parameters in fact act on the quality of the acquired image, modifying the operation of the optical apparatus and of an illuminator associated therewith, and on the type of processing of such an image, affecting the processing of the image for decoding the same.

For example, the optical apparatus can comprise automatic focusing means by means of which it is possible to adjust the focusing of the optical apparatus between several positions. A corresponding parameter can adopt several values for different positions of the focus, for example it can adopt two values, for a focus in a 'near' position and for a focus in a 'far' position. This parameter acts on mechanical or electromechanical components of the optical apparatus to adjust to the required focus distance the system of lenses with which the optical apparatus is provided. There are two possible values for this parameter.

The controlled device can nevertheless also comprise a refocusing filter, and i.e. an algorithm that acts on the acquired image to optimise the focus of the image. One parameter relating to the refocusing filter can have two values, relating to the fact that the filter is active or inactive. Merely by way of example, let us suppose that there are two possible values for this parameter.

Also, the optical information reader can carry out acquisition in different lighting conditions.

For example, if an illuminator is associable with the optical apparatus, a corresponding parameter can assume a first value or a second value, to command acquisition with a switched-off illuminator or acquisition with a lighted illuminator. There are two possible values for this parameter.

If the exposure time is also settable, a corresponding parameter, can, for example, have three values to acquire an image with a 'short', 'medium' or 'long' exposure time. There are three possible parameters for this parameter.

In order to accelerate the processing of the image, it is also worthwhile not always examining the acquired image but only a portion thereof, in particular only the portion of image that is relevant for the purposes of decoding the code. A linear optical code, also known as 1D, can be decoded, also considering only a portion of image, typically a narrow strip, the longitudinal extent of which is parallel to the greater longitudinal dimension and extends over this entire longitudinal dimension. A two dimensional optical code, for example known as 2D, can on the other hand be decoded by considering only a rectangular and/or central square area of the image, of an extent that is less than that of the entire image. Supposing that both the linear code and the two dimensional code are arranged centrally in the acquired image, it is thus possible to consider only respectively a central strip and a central area in the acquired image.

A corresponding localisation parameter of the area of the image to be decoded can, for example, have three values, to consider a portion of image of the 'strip', 'area' or 'entire' type, if the image has to be considered entirely as it was acquired. There are three possible values for this parameter.

In relation to the enabled symbols, a corresponding parameter can have an "1D" value, if only one linear symbology is enabled, "2D" if only a two-dimensional symbology is enabled or "1D and 2D" if both are enabled for decoding. There are three possible values for this parameter.

If we consider the six previously disclosed functional parameters, which identify an example set of settable functional parameters, and for each of these parameters the possible settable values, 216 different values of this example set are obtained, namely 216 different theoretical instances of this example set.

It is pointed out that the term "instance" of a parameter means each possible value that this parameter can assume. Thus the term instance of a set of parameters indicates the set of values that the various functional parameters can assume, considering a specific value for each parameter.

Given thus a set of settable functional parameters, a plurality of theoretical instances correspond to this set that are as many as the possible combinations of different values of these settable parameters.

The number of theoretical instances increases, increasing the settable parameters considered in the example set. If, for example, we consider the possible enabling of a subpixel algorithm for a linear symbology, which is identifiable by a corresponding parameter having an 'active' or 'inactive' value, or an algorithm for two-dimensional symbology for reading two-dimensional codes on reflecting surfaces, having an 'active' or 'inactive' value, the number of the theoretical instances of the example set is 864.

In Table 1 below we have summarised the settable parameters of the example set and the settable values for each parameter, except for the parameters of the subpixel algorithm and of the algorithm for reflecting surfaces, which, for the sake of simplicity, have not been considered below.

TABLE 1

| Examples of parameters | Settable values | Number of settable values |
|---|---|---|
| Focus position | Near Far | 2 |
| Refocusing filter | Inactive Active | 2 |

TABLE 1-continued

| Examples of parameters | Settable values | Number of settable values |
|---|---|---|
| Exposure time | Low<br>Medium<br>High | 3 |
| Illuminator | On<br>Off | 2 |
| Acquired sensor area | Strip<br>Central area<br>The whole image | 3 |
| Enabled symbologies | Only 1D<br>Only 2D<br>1D and 2D | 3 |
| Total possible combinations | | 216 |

As already said previously, the settable functional parameters disclosed above are provided only by way of example. Many others, which are not shown here, influence directly the reading of coded information by a reader, in a manner similar to what has been disclosed until now, and it is desired to refer to all the settable parameters in the description of the decoding method of the present invention.

Each instance of the set of settable parameters corresponds to a different processing mode. In other words, a processing mode corresponds to processing the acquired image with the set of functional parameters assuming a set of specific values. Nevertheless, the number of possible instances of the set of settable parameters is less than the number of theoretical instances inasmuch as the meanings of some settable parameters are connected to one another. For example, the portion of the image to be considered for the purposes of decoding is closely connected to the type of code found in the image and decoding a two-dimensional code on a strip portion of the acquired image has no meaning.

Consequently, starting from a preset number of settable functional parameters a set of such possible instances is identified, to which respective processing modes correspond that are different from one another. The term 'library set' refers to the set of all the possible processing modes corresponding to the set of functional parameters. The number of processing modes that are part of the library set is named as the library number.

However, in addition to the library set of processing modes, from these settable parameters a working set of processing modes is identified, which comprises the processing modes from which a determined processing mode is selectable during the work phase of the portable reader. The number of processing modes that are part of the working set is named the working number and is less than or the same as the library number. In other words, the library set comprises the working set, which is a subset of the library set.

A respective probability of success is associated with each processing mode, this respective probability of success indicates the probability of success of decoding if this processing mode is selected. Selecting the processing modes in the working set and the probabilities of success that are respectively associated therewith is carried out at the moment of the creation of the working set, for example on the basis of the envisaged operating conditions of use of the optical information reader. It should also be noted that it is also possible to associate with each processing mode in the library set, but not comprised in the working set, a respective probability of success upon creation of the library set, to take account of processing modes that are possible but highly unlikely because of the envisaged operating conditions of use.

Nevertheless, this selection may change over time, during the work phase of the acquisition reader, i.e. depend on which processing mode is performed and on the outcome of the processing mode, as will be explained better below. Further, similarly, it is observed that each processing mode can be assigned a respective probability of success not only at the moment of creation of this working set but also following specific events during the work phase of the optical information reader, just in order to modify rapidly the operation of the optical information reader.

Thus, upon creation of the working set each processing mode of the working set is assigned a corresponding probability of success, and in other words a set of probability of success values is created, the number of which is equal to the working number.

In use, the decoding method of optical information of the present invention comprises selecting a processing mode, choosing from the processing modes in the working set the determined processing mode having the highest value of probability of success. After applying this selected processing mode for decoding the code, the probability of success of each processing mode of the working set is updated and this updating occurs both if decoding was successful and if decoding was not successful. In this manner, selecting the processing mode at the subsequent decoding of the acquired image and/or of the subsequent acquired image is not established a priori but can change from one decoding to the subsequent, on the same image and/or in a subsequent acquired image, thus providing an adaptive decoding of the optical information.

If decoding of the acquired image has been successful with the selected processing mode, the probability of success of the selected processing mode is increased whereas the probability of success of each non-selected processing mode of the working set is decreased.

In other words, the selected processing mode is favoured, increasing the probability of success thereof, whilst the remaining processing modes of the working set are penalised, decreasing the probability of success thereof.

If decoding of the acquired image was on the other hand not successful with the selected processing mode, the probability of success of the selected processing mode is decreased whereas the probability of success of each non-selected processing mode of the working set is increased.

The amount of this increase and the amount of this decrease are clearly related inasmuch as in view of a percentage increase/decrease equal to X for the selected processing mode must be matched by a total decrease/increase of the total remaining processing modes that is also equal to X.

This increase and this decrease affect the speed of the optical information reader to adapt to a change in operating conditions. If the increase and the decrease have a modest value, the decoding method of the optical information reader is stable, is not inclined to changes and can thus take a long time to adapt to operating conditions that are subject to modifications.

On the other hand, if the increase and the decrease have a great value, the decoding method of the optical information reader is able to adapt rapidly to operating conditions subject to modifications but is less stable and could therefore give rise to frequent oscillations in the selection of the processing mode.

This increase and decrease can be attributable to all the processing modes or it is possible to provide an increase and a decrease that are associable with each processing mode, of different value.

In FIGS. 1 to 5 there is shown a state diagram in which, for the sake of simplicity, a working set of processing modes is provided that comprises only two distinct modes, which respectively correspond to the two settable values for the functional parameter associated to the enabled symbologies 1D or 2D.

It is hypothesised that the portable reader has just carried out a present processing mode X or is in a present starting state X. The subsequent processing mode, i.e. the future state of the state diagram, is chosen on the basis of the success percentage of the symbology 1D or 2D, which respectively have a 70% and 30% probability of success.

From the processing mode X the processing mode 1D is chosen because the 0.7 probability of success of the processing mode 1D is greater than the probability of success of the 2D symbology, which is 0.3. If the 1D decoding ends successfully, the subsequent selected processing mode is 1D because the probability of success of this processing mode is set at 1 and the remaining processing modes of the working set are set at 0. It should be noted that merely by way of example has the value 1.0, which means certainty, been assigned to the processing mode that has ended successfully, but the amount of the increase could be different.

If, on the other hand, the present processing mode has not ended successfully, we hypothesise that the amount of the increase and the decrease, associated with the processing mode 1D is equal to 20% and that conversely the amount of the increase and the decrease associated with the processing mode 2D is equal to 40%. It is desired that the processing mode 1D be more resistant to changes than the processing mode 2D.

Further, if the percentage of success of two different processing modes is the same, processing mode of the present decoding is confirmed.

The transitions from the present processing mode to the subsequent processing mode are set out in Table 2 below, which illustrates the selection criterion of a specific processing mode, given a defined working set of such processing modes and given a present processing mode, given that the probabilities of success vary over time. Table 2 below shows also the Figure, from FIGS. 1 to 5, in which the selection of the processing mode is shown.

It should be observed that in FIGS. 1 to 9 of the present invention the selectable processing modes are shown as transitions directed from a bubble towards the output and the selected processing mode is shown as a continuous line. The possible and non-selected processing mode/s are shown as a dashed line.

TABLE 2

Figure 2:
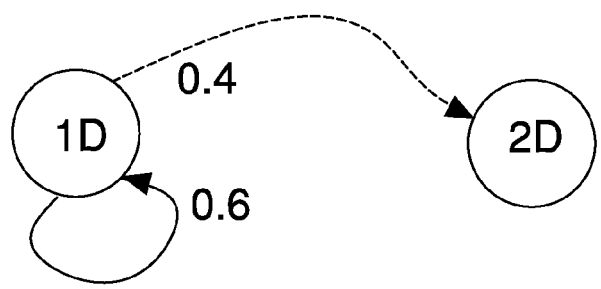
FIGS. 2 to 5 show a diagram that is analogous to that of FIG. 1, for subsequent applications of the decoding method.
Figure 3:
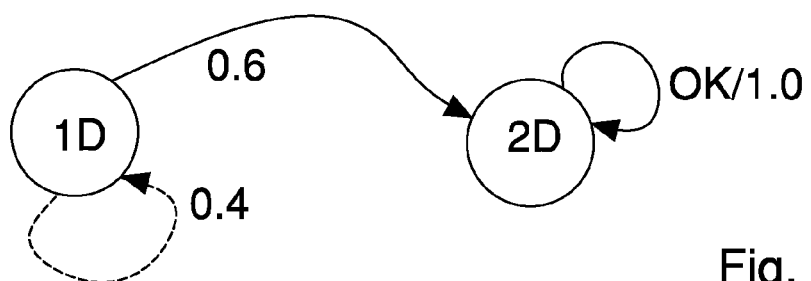

| Present processing mode | % success 1D | % success 2D | Subsequent processing mode | FIG. |
|---|---|---|---|---|
| X | 0.7 | 0.3 | 1D | FIG. 1 |
| 1D - decoding success | 1.0 | 0.0 | 1D | FIG. 1 |
| 1D - decoding failure | 0.8 | 0.2 | 1D | FIG. 1 |
| 1D - decoding failure | 0.6 | 0.4 | 1D | FIG. 2 |
| 1D - decoding failure | 0.4 | 0.6 | 2D | FIG. 3 |

TABLE 2-continued

Figure 4:
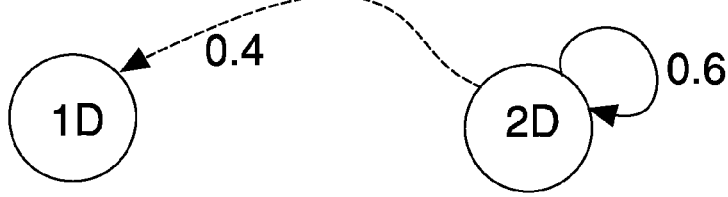
Figure 5:
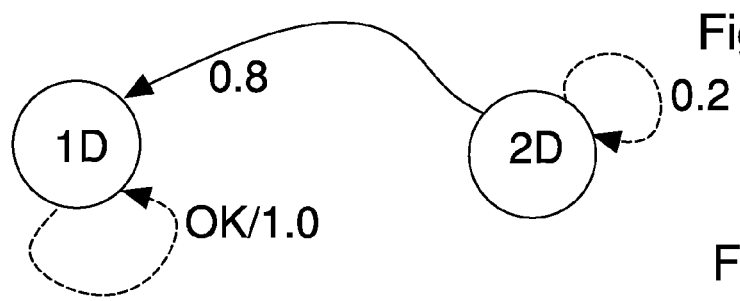

| Present processing mode | % success 1D | % success 2D | Subsequent processing mode | FIG. |
|---|---|---|---|---|
| 2D - decoding success | 0.0 | 1.0 | 2D | FIG. 3 |
| 2D - decoding failure | 0.4 | 0.6 | 2D | FIG. 4 |
| 2D - decoding failure | 0.8 | 0.2 | 1D | FIG. 5 |
| 1D - decoding success | 1.0 | 0.0 | 1D | FIG. 5 |

In one version of the decoding method based on the increase and/or decrease of the probabilities of success of the processing modes of the working set, it is provided for that the working set can be modified. In other words, processing modes that are part of the library set can be added to the working set, which processing modes can be deemed to be of secondary interest in an initial configuration phase of the portable reader.

In order to modify the working set, the processing mode can be, for example, analysed that has not ended successfully and different processing modes can be consequently inserted into the working set that were not considered previously. Selecting the processing modes for the working set and selecting the respective probabilities of success assigned to each of them that can be run at the subsequent decoding, is thus a function of the processing mode that has been selected and run at present, i.e. it is a function of the current state.

A set of commuting processing modes are thus identified and with each of such commuting processing modes there is associated a corresponding previously a priori defined set of grouped processing modes. Each of such sets of grouped processing modes is thus associable with a specific commuting processing mode and is usable as a working set when the respective commuting processing mode is applied and ends without success. In other words, one or more commuting processing modes can be chosen at which, if decoding is not successful, the working set is modified.

In order to modify the working set, it can also be checked whether all the processing modes present in the working set have been unsuccessful, and whether the selected and applied processing mode is actually a last attempt to decode via the processing modes of the working set. In this case, if the selected processing mode is in the grouped set of commuting processing modes, the working set is modified by choosing the respective previously defined set of grouped commuting processing modes as a function of the selected processing mode, and with each processing mode of the modified working set a corresponding probability of success value is associated.

Alternatively, the failure of the decoding of the selected processing mode can be analysed and a cause of failure of decoding can be defined. Selecting the processing modes for the working set and the respective probabilities of success assigned to each mode, can thus depend on the current state in which the reader finds itself and/or on the reason why the last decoding attempt failed. Further, the value of such probabilities of success can be modified over time on the basis of the actual number of successes and failures obtained.

It should be noted that this analysis of the cause of the failure is conducted here only when also the last selected processing mode of the working set was not successful, to avoid decoding could end with an error.

Nevertheless, according to one embodiment of the decoding method of the present invention, this failure can also be analysed whenever decoding of the acquired image with the selected processing mode was not successful, in order to identify a cause that is associable with the failure or in order to extract further information relating to the acquired image.

It should in fact be noted that from the application of a processing mode for an acquired image, which has not ended successfully, it is possible to obtain additional information from which to extrapolate directly or indirectly the cause of failure of the decoding. For example, it is possible to know if decoding of the image has failed because the image is out of focus, dark, poorly contrasted, has low resolution or because of only partial framing of the code.

In addition to the settable functional parameters, it is possible to identify a set of possible causes of failure of decoding of the image and associating with each of said causes of failure respective specialised subsets of such settable functional parameters. Each specialised set of parameters comprises only those parameters that it makes sense to modify in response to a determined cause of failure. For each specialised set of parameters, corresponding specialised sets of processing modes can be defined, each of said specialised sets of processing modes being obtainable as an instance of the corresponding specialised set of parameters and being related with a different cause of failure. With each processing mode of the specialised set a corresponding probability of success is associated.

A specialised set of parameters is normally associated with each specific cause of failure and thus a specialised set of processing modes and of respective probabilities of success is associated therewith.

Nevertheless, it is pointed out that several different specialised sets of parameters can also be associated with a specific cause of failure inasmuch as, in view of the same cause of failure, a different working set could be selected in function of the preset selected and applied processing mode, the decoding of which ended in failure. In other words, if the selected processing mode is the present state in which the reader of coded information finds itself, selecting a possible future state can depend only on the cause of failure or on both the cause of failure and on the present state of the reader. Further, if a single specialised set of parameters and consequently a single specialised set of processing modes is associated with a cause of failure and consequently a single specialised set of processing modes is associated with a cause of failure it is possible to provide several possible sets of corresponding probabilities of success, each of which is attributable to the cause of failure and to the present state in which the acquisition reader finds itself.

If during operation of the optical information reader a cause of failure is not identified, it is checked whether the selected processing mode is identified amongst the commuting processing modes.

If the selected processing mode is not part of the set of commuting processing modes, the working set is then confirmed. In other words, the processing modes that are part of the working set remain the same and what has been said before regarding the criterion based on the probability of success applies. Selecting the subsequent processing mode is thus only a function of the probability of success associated with each processing mode of the working set.

If, on the other hand, a cause of failure is not identified, and if the processing mode is identified amongst the commuting processing modes, then the working set is modified by choosing the respective previously defined set of grouped commuting processing modes, as a function of the selected processing mode identified as a commuting processing mode.

If on the other hand the cause of failure is identified, the working set is modified by choosing from the possible processing modes of the library set those processing modes related with a solution of the cause of failure. The working set is updated following the analysis of the causes of failure and can comprise processing modes that are the same as and/or different from the working set of the preceding decoding. The selectable processing modes, given an applied processing mode and a cause of failure resulting from this applying, may be different from those that could have been selected if the cause of failure had been unknown.

It is thus noted that different causes of failure can correspond to a different working number of processing modes belonging to the working set and/or processing modes that are completely or only partially different. The working set takes on, for example, the value of the specialised set associated with the identified cause of failure, or more flexibly, the working set is updated by historical statistical information maintained by the controlling device on the type of processing mode that most frequently, over a set period of time, for the same number of causes of error identified, has obtained the greatest number of successful decoding occurrences. The working set is updated with the working mode with the greatest number of occurrences.

Figure 6:
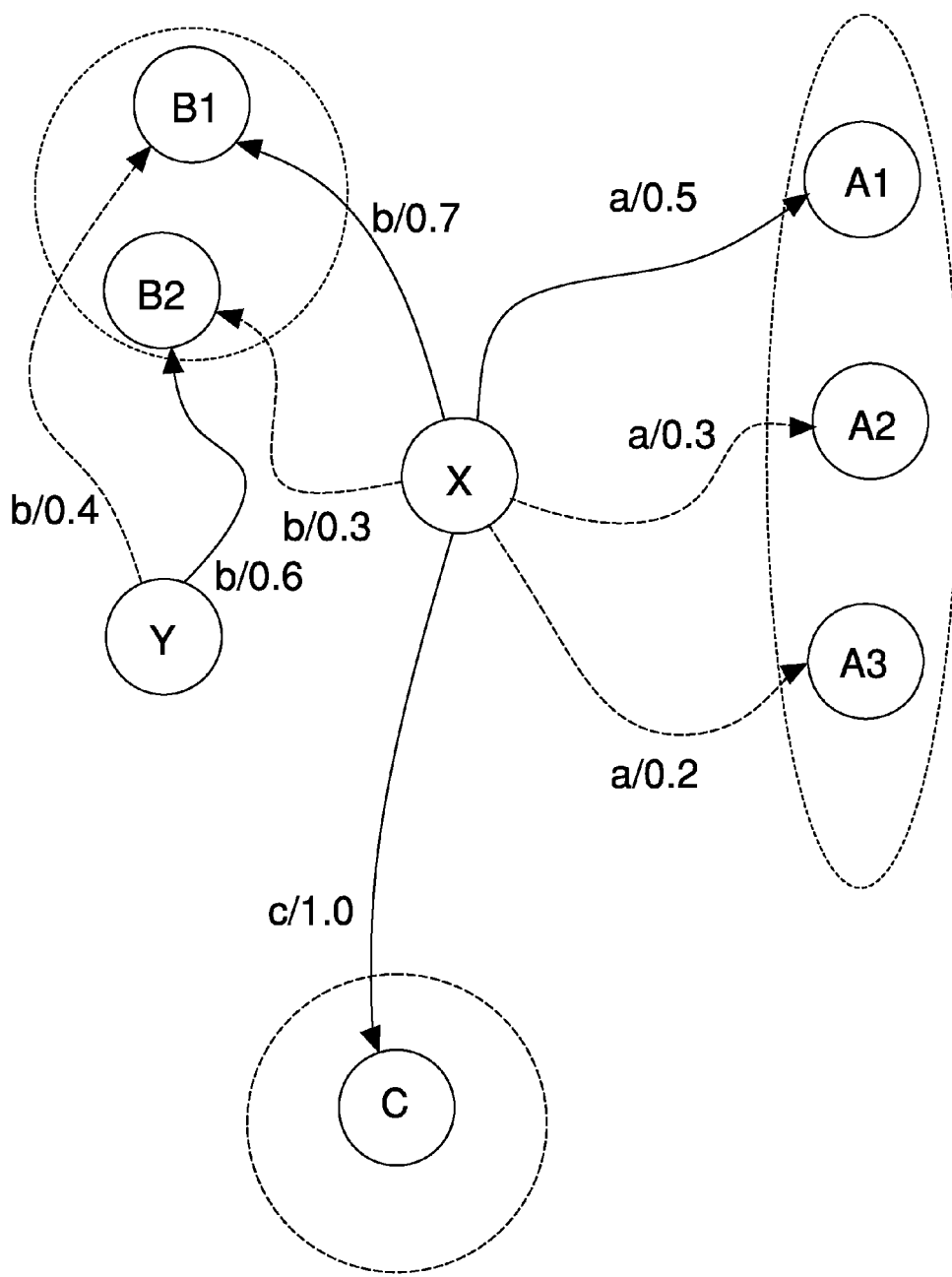
FIG. 6 shows a state diagram that illustrates how from a present processing mode X the subsequent processing mode is selected, in which each processing mode is represented by a bubble and each transition from a present processing mode to the subsequent processing mode is determined by the cause of failure of decoding by means of the present processing mode and by means of the probability of success of the processing modes for the working set, and in which this cause of failure and this probability of success are expressed in the form Y/0.W in association with the directed transition line to the subsequent processing mode.

In FIG. 6 there is shown a selection of a specific processing mode, as a function of the probability of success and of the cause of failure of such processing modes. It is hypothesised that the optical information reader has just carried out a present processing mode X or is in a starting state X and that the selected method X has not been successful. The cause of failure of this processing mode is analysed.

If the cause of failure is "a", the working number is three and the working set thus comprises three processing modes, which are A1, A2, A3. The processing mode A1 has been chosen from the modes of the working set, which processing mode has the greatest probability of success. If, on the other hand, the cause of failure is "b", the working number is two and thus the working set comprises two processing modes, which are B1 and B2, from which b1 is chosen, which has the greatest probability of success. If the cause of failure is "c" the system is deterministic inasmuch as only C1 can be chosen and there are no alternatives.

Thus given a specific cause of failure, the processing mode with the greatest probability of success is selected.

Nevertheless, if we hypothesise that the optical information reader has just performed a present processing mode Y or is in a start state Y, that the selected Y method has not been successful and that the cause of failure is "b", the working set comprises the two processing modes B1 and B2, but between the processing modes b2 and not b1 has been chosen, inasmuch as b2 has the highest probability of success.

If should be noted that selecting the subsequent processing mode, for the same cause of failure, differs according to whether state X or Y is the present state. In other words, it is desired to emphasise that the working set, the corresponding probabilities of success and the conditions of failure from a state Y, different from X can be different from those used starting from X itself.

This flexibility enables very complex behaviours to be achieved in a relatively simple manner and great adaptive capacity to different operating conditions to be obtained.

The specialised subsets have particular relevance for very complex optical information readers in which the settable functional parameters are very numerous. It is thus advantageous to group some functional parameters into subsets by correlating the processing modes.

For example, the parameter that sets the focus and acts by adjusting the lens system of the optical apparatus can be related to the parameter that acts on the refocusing filter. Similarly, the parameter that commands the illuminator is associable with the parameter that commands the exposure time of the optical apparatus and the localisation parameter of the area of the image to be decoded can be related with the parameter that specifies the enabled symbology.

Three specialised subsets of library processing modes can be thus defined, each associated with a different cause of failure, and which are suitable for solving the problem that caused the failure.

It will be seen below that the working set is updated each time and following unsuccessful processing updates as a function of the cause of failure and assumes the values of the respective specialised subset, entirely, or also partially.

In fact, in some transitions from one processing mode to the subsequent, the working set can also comprise a subset of the specialised set with a highly reduced number of processing modes, if the cause of failure is indicative that it is possible to choose between a small number of possible processing modes. Otherwise, the working set can comprise the same processing modes as the specialised set, if the cause of failure is more general and more choices of processing modes for resolving the failure are possible.

In Table 3 we summarise the settable parameters specialised in the control of the focus of the image and the settable values for each parameter.

TABLE 3

| Examples of parameters | Settable values | Number of settable values |
|---|---|---|
| Focus position | Near = 1<br>Far = 2 | 2 |
| Refocusing filter | Inactive = 0<br>Active = 1 | 2 |
| Total possible combinations | | 4 |

In Table 4 we summarise the settable parameters specialised in the control of the illumination of the image and the settable values for each parameter.

TABLE 4

| Examples of parameters | Settable values | Number of settable values |
|---|---|---|
| Exposure time | Low = 1<br>Medium = 2<br>High = 3 | 3 |
| Illuminator | On = 0<br>Off = 1 | 2 |
| Total possible combinations | | 6 |

In Table 5 we summarise the settable parameters specialised in the control of the enabled symbology and the settable values for each parameter

TABLE 5

| Examples of parameters | Settable values | Number of settable values |
|---|---|---|
| Acquired sensor area | Strip<br>Central area<br>The whole image | 3 |
| Enabled symbologies | Only 1D<br>Only 2D<br>1D e 2D | 3 |
| Total possible combinations | | 9 theoretical,<br>5 possible |

Consequently, instead of considering the 216 theoretical combinations of the instances of functional parameters, which may have been reduced to avoid a priori combinations without meaning, it is possible to consider only the combinations of these specialised subsets of settable functional parameters. In the example indicated above, the possible combinations are 120, equal to 4*6*5, corresponding to the same number of processing modes. These 120 processing modes can be defined completely using three distinct specialised subsets, respectively of 4, 6, and 5 different members that can be represented in three distinct state diagrams totalling 4+6+5=15 states. The total number of processing modes is anyway equal to 120 but there is a significant reduction in the complexity of the selection mode for selecting the processing mode, within each specialised set.

In fact, if we consider the specialised subsets of processing modes, by associating with each cause of failure one of these sets, or, as said previously, also a subset of these sets, it is possible to select the processing mode for decoding from a much smaller number of processing modes.

If an image is not focused, it is appropriate to apply processing modes for controlling the focus and not for selecting the applicable symbology. Similarly, a cause of failure due to the fact that the image is dark is certainly resolved by a processing mode linked to controlling the luminosity of the image rather than the focus of the image.

However, if the analysis of the failure of decoding identifies several causes of failure, for example the image is out-of-focus and dark, parameters of even different specialised set can be simultaneously modified, in the sense that the resulting processing mode is one of the 120 possible processing modes, considering that the parameters of each specialised set can also be modified simultaneously.

In Table 6 below we consider the causes of failure/additional information that is obtainable by analysing a decoding that ends in failure and the possible values of such causes/additional information. Starting with such causes of failure, which are each associated with a respective specialised set of processing modes, the selection criterion of the processing mode will be disclosed below.

TABLE 6

| Examples of causes of failure/additional information | Possible values |
|---|---|
| Code out-of-focus<br>Image luminosity | NF = code not in focus;<br>B = dark;<br>S = saturated; |
| Localised symbology | 1D = code localised 1D;<br>2D = code localised 2D;<br>N = code NOT localised |

Figure 7:
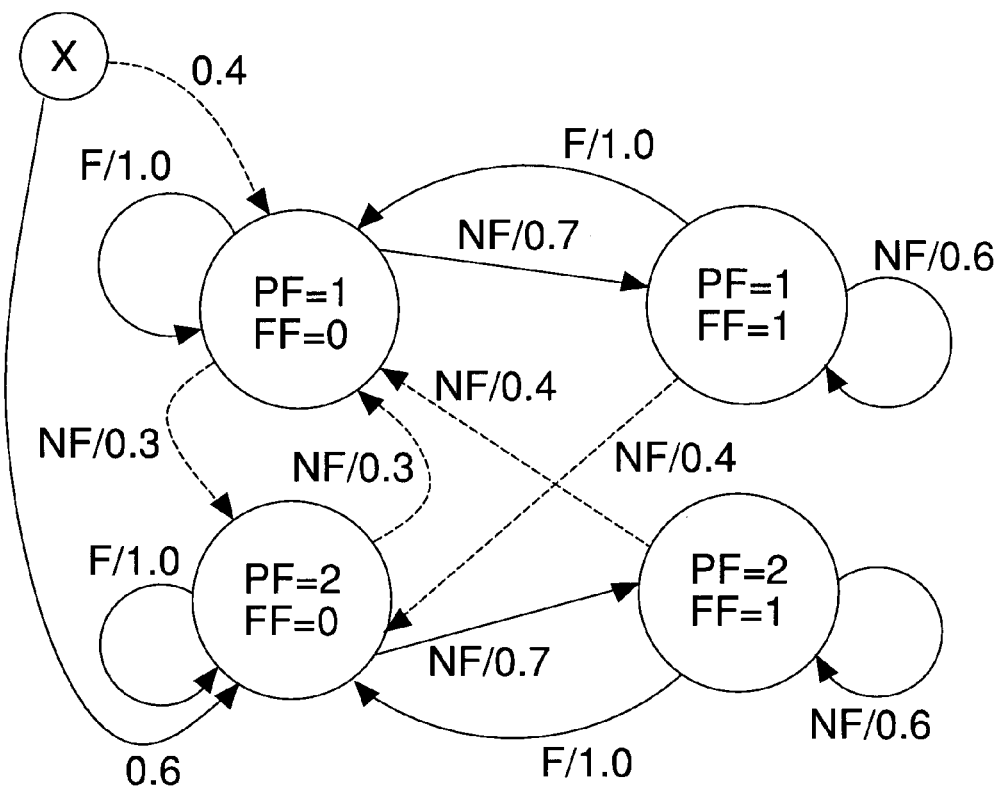
FIG. 7 shows a diagram of the same type as the one in FIG. 6, in which a set of processing modes for a specialised set for control focussing and of the refocusing filters is considered.

In FIG. 7, there is represented a state diagram relating to a working set of processing modes that comprises four distinct modes, that respectively correspond to the two settable values for the functional parameter connected to the focus position and to the filter. The working set corresponds to the specialised focus control set.

It is hypothesised that the optical information reader is in an initial state or has just performed the present processing mode X and we now consider the cause of failure/the additional information that is obtainable from the analysis of the cause of failure of the selected processing mode.

In the diagram of FIG. 7, "F" indicates a focused image, "NF" indicates an unfocused image. It is pointed out that, as we shall see below, it is also possible that decoding will end in failure even if the acquired image is focused. From the present processing mode X, we hypothesise that the failure of decoding is due to the fact that the image is not focused.

The subsequent processing mode is chosen as:
Focus position (PF)=far=2;
Refocusing filter (FF)=inactive=0.

In the event of failed decoding, activation of the focusing filter is favoured and thus the processing mode with FF active=1 is selected rather than the shift of the focus with the focus position near, PF=1, inasmuch as the refocusing filter by means of the controlling device is faster than the movement of the lens system.

If the image continues to be out of focus, the probability of success of the processing mode corresponding to state PF=2 FF=1 is decreased and the probability of success of the processing mode corresponding to state PF=1 FF=0 is correspondingly increased, and shift of the focus to "near" is thus actuated by moving the optical system and the refocusing filter is deactivated.

If this is not yet sufficient to produce a focused image, the refocusing filter is reactivated, increasing the probability of success of the processing mode corresponding to PF=1 and FF=1.

Selecting the future processing mode from the present processing mode, i.e. the transitions inside the continuous state diagram, continues until decoding is reached and the success percentage of the processing modes with enabled filters will accelerate or slow the decision to change the focus position rather than make several attempts with the same focus but with enabled filters.

If, in addition, the optical information reader is portable and is grasped by an operator, it is frequent that the operator acquires the images by arranging the reader near rather than far, to read optical information of interest. The acquisition methods with the focus position "near" will be favoured and therefore the probability of success thereof will be increased. We observe that the probabilities of success are continuously updated on the basis of the decoding attempts that ended in success or failure and therefore the reader is able to adapt to the operating method during the work phase.

As an applicational example, we consider two optical information readers used in two distinct checkouts of a 'DIY' supermarket. The first reader is used in a checkout in which mainly small objects are read from near, whereas the second reader is used in a special checkout dedicated to large objects, in which objects in the trolley are mainly read from far. The readers adapt automatically during the work phase to the operating mode with which they are used, the first reader favouring the processing mode in which a focus is provided from near and in which it is rarely attempted change the focus from far, the second reader favouring the processing mode in which focus from far is envisaged and rarely a reading from near. It should be noted that in this manner, the optical information reader adapts automatically to the operating method used, with no need for complex configurations by the user.

Figure 8:
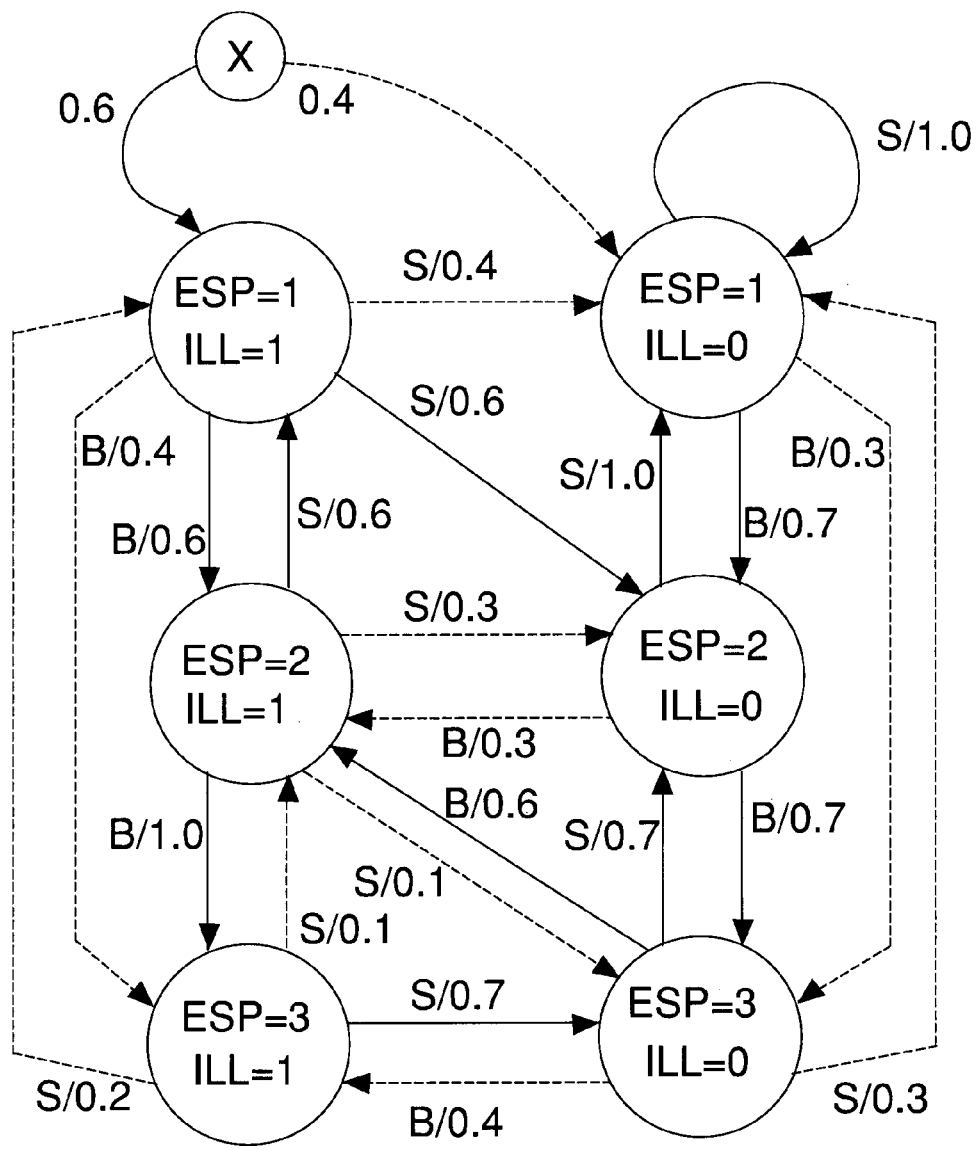
FIG. 8 shows a diagram of the same type as the one in FIG. 6, in which a set of processing modes is considered for a specialised set for controlling exposure time and the illuminator.

The specialised set for controlling lighting comprises six distinct processing modes, that respectively correspond to the two settable values for the illuminator activation parameter and for the three settable values for the parameter related to exposure time. In FIG. 8 we consider the diagram that represents the working set corresponding to the specialised set for controlling lighting. In the diagram in FIG. 8 and with reference to Table 6, there are two possible causes of error and with "B" a dark image is indicated whereas with "S" a saturated image is indicated.

In case of a dark image, we have the possibility of increasing exposure time or, if the illuminator was off, of switching on the illuminator. In case of a saturated image, we have the possibility of reducing exposure time or of switching off the illuminator, if it is on.

It is hypothesised that the optical information reader is in an initial state X and has therefore performed the present processing mode X and we now consider that the decoding failure is due to the fact that the image is dark. In the subsequent processing mode the illuminator is switched on and in particular the parameters of interest have the value:
Exposure time (ESP)=low=1;
Illuminator (ILL)=active=1.

In other words, the processing mode is selected that corresponds to the parameters instanced as above.

It is observed that modifying exposure time is preferable to switching on or switching off the illuminator, inasmuch as it is possible to ensure finer control of the illumination. Nevertheless, as use of the reader varies, the selected processing modes can vary. For example, the frequent use of the reader with reflecting codes such as, for example, plasticised labels or labels displayed by the display of a mobile phone, will tend to favour states with the illuminator switched off that do not therefore produce reflexes whereas the use for reading codes from far, and thus with images that tend to be dark, will tend to favour states with the illuminator switched on.

Figure 9:
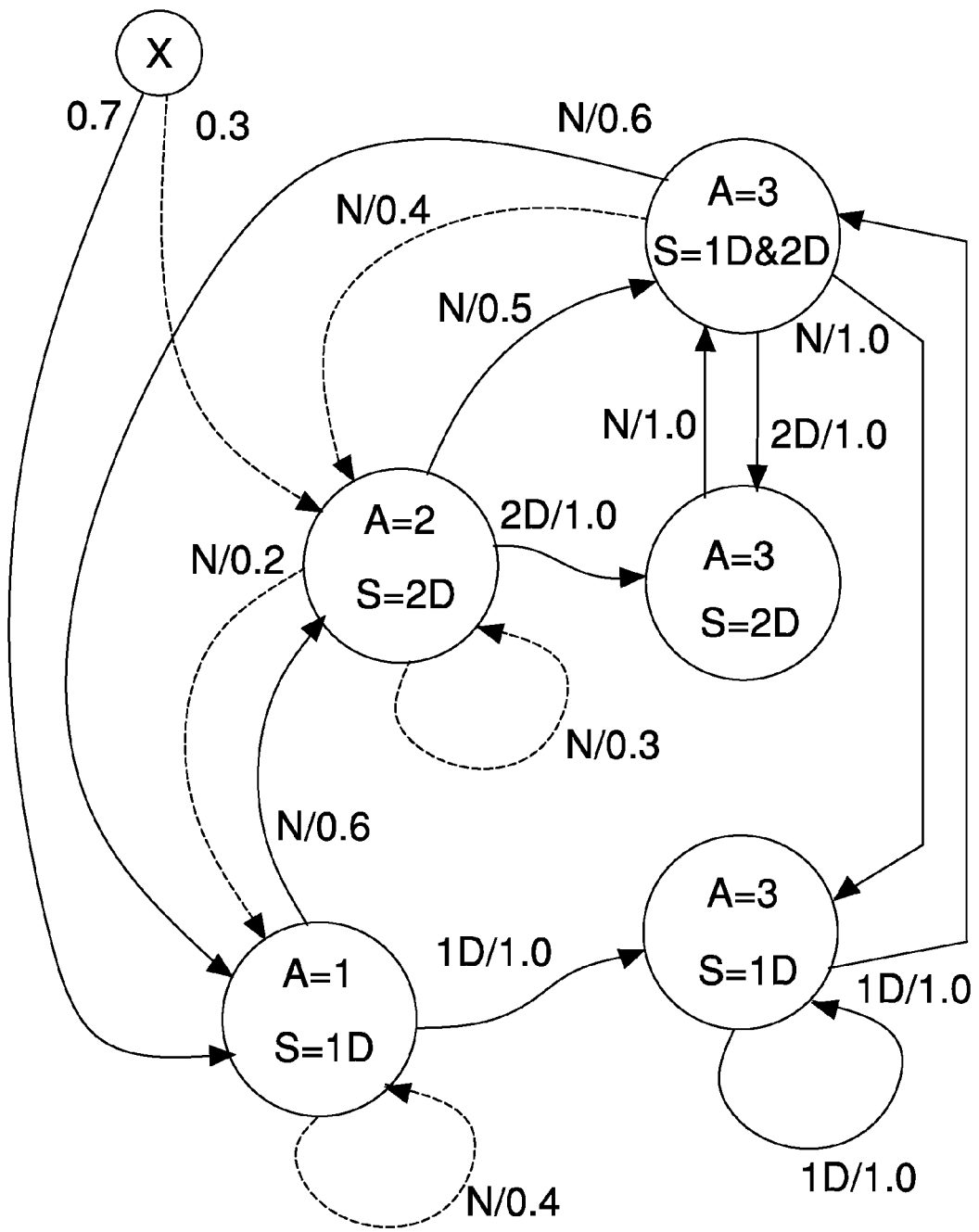
FIG. 9 shows a diagram of the same type as the one in FIG. 6, in which a set of processing modes is considered for a specialised set for controlling the portion of image in which the information is coded and the type of enabled symbology.

The diagram in FIG. 9, with reference to table 6, illustrates the selection criterion of the subsequent processing mode when it is desired to control the enabled symbology in relation to the portion of the acquired image. In fact, it is appropriate to analyse only partially an acquired image if it is desired to accelerate decoding of the optical information.

It is preferred to favour analysing the central image strip to identify linear codes and then proceed in succession with analysing the central portion and then subsequently analysing the entire image. In this manner, if decoding is not successful, the cause of failure provides information about the symbology that is applicable to the subsequent processing mode.

By indicating with "1D" the cause of error, we mean that decoding with a different symbology has been applied, but that the symbology 1D has been recognised, and/or the symbology 1D has been recognised in an image portion that is not sufficient for decoding. With "2D" we intend to indicate in a manner that is similar to the previous case that the symbology 2D has been recognised but a different symbology has been applied and/or a symbology 2D has been applied in an image portion that is not sufficient for decoding. The cause of error, 1D or 2D, in this case is more precisely said the additional information that is obtainable from decoding the image. With "N", on the other hand, we intend to indicate that there is no additional information from decoding the image and that therefore the working set is confirmed. Given the present processing mode, the subsequent processing mode must be chosen from the same processing modes of the working set, because the working set does not change.

An attempt is first made with the narrow strip that extends over the whole image to read only the linear codes, then an attempt is made with the central area of the image to read only the 2D codes and lastly an attempt is made with the entire image and both the 1D and 2D symbologies when the preceding attempts have not been successful.

Nevertheless, the most efficient area of the sensor for reading the corresponding symbology will be favoured. It should, however, be observed, that following the application of a processing mode that does not end successfully but enables a linear or two-dimensional symbology to be identified, it is possible to select a deterministic subset of the specialised control set of the decoding symbology, when decoding is easily resolvable with a specific processing mode.

Figure 10:
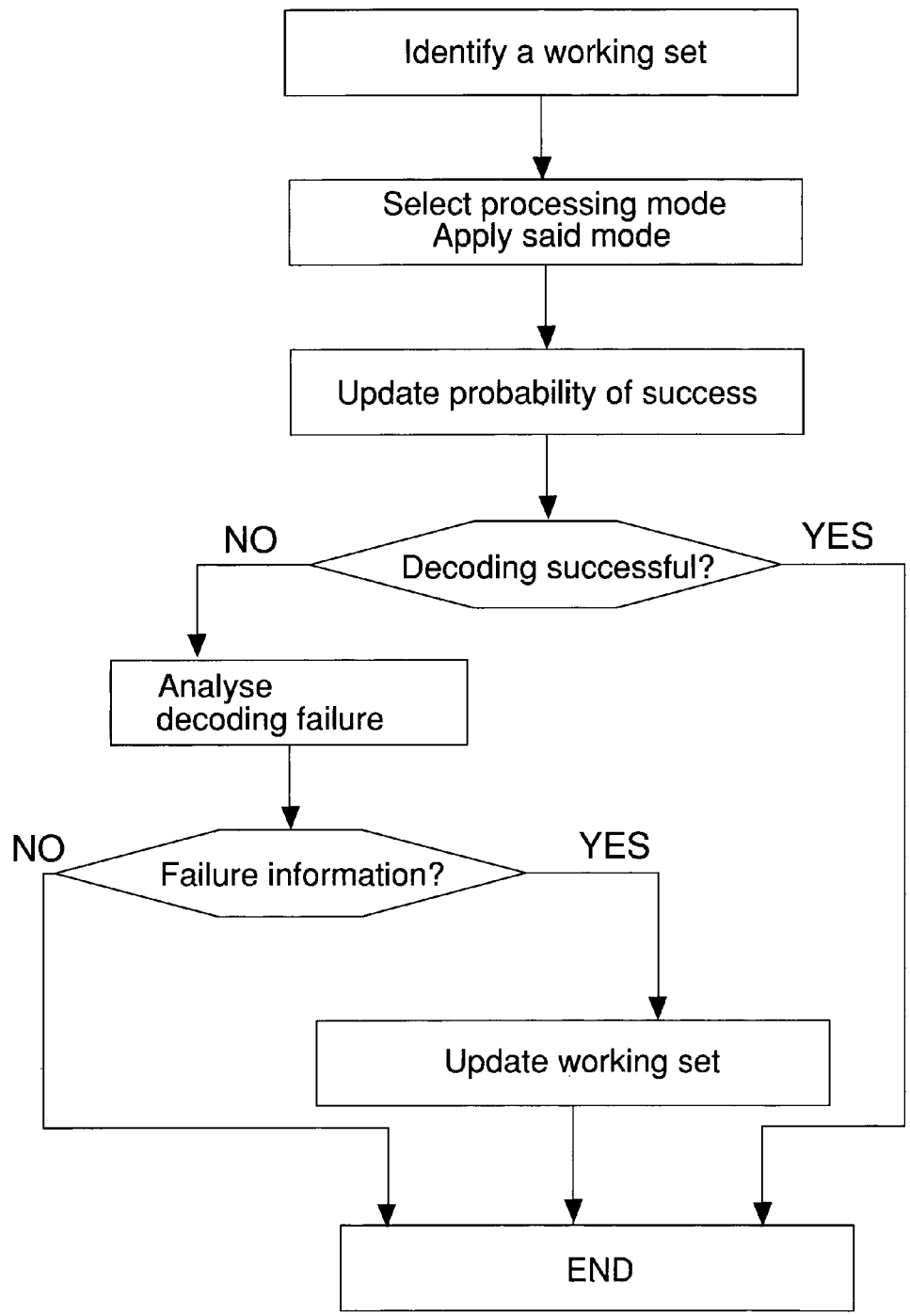
FIG. 10 shows a flow diagram of the decoding method that is the object of the present invention.

FIG. 10 summarises the method of the present invention.

We have said that the optical information reader of the present invention uses the method of the present invention to decode optical information present in an acquired image.

A programme is provided in association with the optical information reader, which comprises a code for implementing the decoding method according to the invention when this programme is run in the reader. The programme can be, for example, run by the controlling device of the acquisition reader when stored in the optical information reader.

In order to decode coded information, a working set of processing modes is provided, and with each of these processing modes a respective probability of success is associated and the processing mode having the highest probability of success value is thus selected. After this processing mode has been applied, the probability of success of each processing mode for the working set is updated. If decoding does not end successfully, decoding of the acquired image is again attempted by selecting a determined processing mode of the working set. Nevertheless, as the probabilities of success have changed, the processing mode applied to the subsequent decoding can change with respect to the processing mode applied to the previous decoding.

Owing to this selection criterion for selecting the processing mode, which is based on updating the probabilities of success after each decoding, it is thus possible to devise a non-deterministic decoding method that does not attempt to improve the acquired image but tries to choose the best processing mode for the acquired image.

Further, by simply modifying the probabilities of success of the working set, and thus setting new values for the processing modes, it is possible to modify the applicational method of the optical information reader rapidly, during the work phase. If this modification of the probabilities of success is commandable by an operator, for example when an operator already knows that he is about to use the reader differently form the past, the optical information reader is able to change the applicational mode rapidly. Nevertheless, even without an external intervention by an operator, the optical information reader can rapidly adapt to the new operating mode, owing to the fact that the processing modes that end in success are favoured at each processing.

It will thus be possible to move, for example, a portable reader that reads in a dark environment optical information of industrial type (for example linear codes of type CODE 39) from a warehouse to an external reception point in which ambient lighting is much greater and the optical information is typically of logistical type (e.g. two-dimensional codes of the Datamatrix type). Without the need to reconfigure the optical information reader, this will adapt quickly and in an optimum manner to the new operating modes. It is observed that the adaptability of decoding can also be activatable by an operator who is able to initiate and terminate a training session. Now, the profile of each operator can be stored in the optical information reader, corresponding to a respective working set and to respective probabilities of success, which is, for example, activatable by reading a personal identification label.

It is further observed that according to the decoding method of the present invention processing modes can also be applied that a priori might not be deemed to be valid and would be considered to be non-preferred choices if the decoding method were entirely deterministic.

For example, an optical code is frequently printed with low quality if the printing device is a needle or ink-jet printer or a laser marker with high printing speed. In this case, each optical code element is formed of small dots alongside one another and the most successful decoding processing mode is the one in which the code is not focused. In fact, owing to lack-of-focus, the dots are joined to form a more homogenous element. Also an image that is out of focus can thus be decoded successfully.

In other applications, such as, for example, codes printed directly on rough surfaces, the processing mode has the greatest decoding success is the one on which the code is overexposed. If in fact the image in which the code is present is overexposed the background irregularities are eliminated by the overexposure of the image and decoding of the optical code ends in success.

Nevertheless, these processing modes cannot be considered, at the initialisation of the library set and/or of the working set, processing modes with a high probability of success inasmuch as they relate to particular decoding cases that should not occur a priori.

The adaptive decoding of the present invention enables optical information in the acquired image to be decoded even in these cases that were not initially foreseen. During operation, the reader will increase the probability of success of the 'non-focused' processing mode or of the mode with switched-on illuminator and long exposure time, the more optical codes printed in a non-ideal manner will be read by the portable reader.

Still with reference to FIG. 10, the method of the present invention comprises analysing the reason for the failure of the processing mode applied for decoding and modifying the working set, by updating the working set with those working modes that are related to the cause of failure and are able to resolve such causes.

Thus owing to the additional information that is obtainable from each decoding by analysing the reason for the failure of the decoding, the decoding method of the present invention permits rapid solutions to the recorded failure, inasmuch as from all the possible processing modes of the library set it is possible to select the processing modes that are most suitable for resolving the analysed cause of failure.

We observe that there can also be a great number of processing modes of the library set and that it is therefore possible to provide many a priori processing modes because only some are actually implemented. Also when the working set are assigned processing modes of a specialised set, the probability of success attributed to each processing mode of such a set, together with the information on the cause of failure and also as a function of the selected processing mode, ensures that decoding automatically adapts to the acquired image.

For example, in an optical information reader of fixed type, if decoding ends in failure because a linear code is only partially framed in the acquired image, subsequent decoding will be fast because the processing mode with the highest probability value will be the specific processing mode for a 1D code. Or alternatively, all the images acquired with partial codes can be rejected until an image is acquired of a correctly framed linear code.

What is claimed is:

1. A method for decoding optical information present in an acquired image, and comprising:
    identifying a set of functional parameters that are settable for processing said image and a plurality of instances of said set of functional parameters, and in which each of said instances corresponds to a different processing mode for said image;
    selecting a processing mode for decoding said optical information from the processing modes of a working set of processing modes;
    applying said selected processing mode; and
    associating with each processing mode a respective probability of success;
    wherein said selecting a processing mode comprises:
        choosing the processing mode with a highest probability of success value;
        updating after said applying said selected processing mode, both if said decoding was successful and if said decoding was not successful, a probability of success of each processing mode of said working set, such as to provide adaptive decoding of said optical information,
    wherein a library set of processing modes for decoding said code corresponds to said plurality of instances, said library set being formed of a preset number of different processing modes, said preset number being greater than or the same as the number of processing modes of which said working set is formed,
    the method further comprising identifying a set of possible causes of failure of said decoding and associating with each of said causes of failure a respective specialised subset or a plurality of respective specialised subsets of said settable functional parameters, to define a respective specialised set or a plurality of respective specialised subsets of said processing mode, each of said specialised sets being related with a different cause of failure.

2. The method according to claim 1, wherein each different processing mode is optimised with respect to a time required to decode the optical information.

3. The method according to claim 1, and comprising creating said library set and/or said working set and associating with each processing mode of said working set a corresponding value of probability of success.

4. The method according to claim 1, and comprising identifying a set of commuting processing modes in said library set and associating with each of said commuting processing modes a corresponding previously defined set of grouped commuting processing modes.

5. The method according to claim 4, and further comprising:
    decreasing the value of probability of success of said selected processing mode and increasing the probability of success of each non-selected processing mode of said working set, if said decoding said acquired image was not successful; and
    if said decoding said acquired image was not successful and if said selected processing mode is in said set of commuting processing modes, modifying said working set by selecting a respective previously defined set of grouped commuting processing modes, said set of grouped commuting processing modes being a function of said commuting processing modes,
    said method further comprising associating a corresponding value of probability of success with each processing mode of said modified working set.

6. The method according to claim 4, and further comprising;
    decreasing the value of probability of success of said selected processing mode and increasing the probability of success of each non-selected processing mode of said working set, if said decoding said acquired image was not successful; and
    if all the processing modes of said working set have been unsuccessful and said selected processing mode is a last of said decoding attempts by means of said working set and said selected processing modes is in said set of commuting processing modes, modifying said working set by selecting a respective previously defined set of grouped commuting processing modes as a function of said selected commuting processing modes, and
    wherein said method further comprises associating a corresponding value of probability of success with each processing mode of said modified working set.

7. The method according to claim 1, and comprising associating with each processing mode of said specialised subset or of said plurality of respective specialised subsets of processing modes, a corresponding value of probability of success.

8. The method according to claim 1, and comprising increasing the probability of success of said selected processing mode and decreasing the probability of success of each non-selected processing mode of said working set, if said decoding said acquired image was successful.

9. The method according to claim 8, wherein said increasing is equal to a modest increase for providing a decoding method of said reader that is able to adapt slowly to possible environmental changes or said increasing is equal to a great increase for providing a decoding method for decoding said reader that is able to adapt rapidly to possible environmental changes.

10. The method according to claim 1, and comprising decreasing the value of probability of success of said selected processing mode and increasing the probability of success of each non-selected processing mode of said working set, if said decoding said acquired image was not successful.

11. The method according to claim 10, and further comprising, if all the processing modes for said working set have been unsuccessful and said selected processing mode is a last of said decoding attempts by means of said working set, modifying said working set by analysing said failure of said decoding of said selected processing mode to identify a cause of failure of said decoding.

12. The method according to claim 1, wherein a start and/or an end of said updating said value of probability is commandable by an operator for the purpose of starting and/or terminating said adaptive decoding.

13. The method according to claim 1, and comprising associating with each processing mode of said library set and/or said working set a corresponding new value of probability of success for modifying the application mode of said optical information reader.

14. A reader of optical information, comprising:
   an optical image acquisition apparatus;
   a controlling device for commanding said acquisition of images and processing of said acquired images; and
   a computer readable storage medium encoded with computer program instructions, such that when the computer program instructions are executed by the controlling device, the controlling device performs a method for decoding optical information according to claim 1.

15. A method for decoding optical information present in an acquired image, and comprising:
   identifying a set of functional parameters that are settable for processing said image and a plurality of instances of said set of functional parameters, and in which each of said instances corresponds to a different processing mode for said image;
   selecting a processing mode for decoding said optical information from the processing modes of a working set of processing modes;
   applying said selected processing mode; and
   associating with each processing mode a respective probability of success;
   wherein said selecting a processing mode comprises:
      choosing the processing mode with a highest probability of success value;
      updating after said applying said selected processing mode, both if said decoding was successful and if said decoding was not successful, a probability of success of each processing mode of said working set, such as to provide adaptive decoding of said optical information,
   the method further comprising:
      decreasing the value of probability of success of said selected processing mode and increasing the probability of success of each non-selected processing mode of said working set, if said decoding said acquired image was not successful,
      if all the processing modes for said working set have been unsuccessful and said selected processing mode is a last of said decoding attempts by means of said working set, modifying said working set by analysing said failure of said decoding of said selected processing mode to identify a cause of failure of said decoding, and
      modifying said working set if a cause of failure of said decoding is identified,
   wherein a library set of processing modes for decoding said code corresponds to said plurality of instances, said library set being formed of a preset number of different processing modes, said preset number being greater than or the same as the number of processing modes of which said working set is formed,
   wherein said modifying said working set comprises choosing, in said library set, processing modes related with a solution of said cause of failure and updating said working set with said processing modes related with said cause, and
   wherein said method further comprises associating a corresponding probability of success value with each processing mode of said modified working set.

16. The method according to claim 15, and further comprising if a cause of failure of said decoding is not identified and if said selected processing mode is not part of said set of commuting processing modes, confirming said working set.

17. The method according to claim 15, and further comprising if a cause of failure of said decoding is not identified, and if said selected processing mode is part of a set of commuting processing modes, modifying said working set by selecting a respective previously defined set of commuting processing modes that are grouped as a function of said selected commuting processing modes and wherein said method further comprises associating a corresponding value of probability of success with each processing mode of said modified working set.

18. The method according to claim 15, further comprising:
   identifying a set of possible causes of failure of said decoding and associating with each of said causes of failure a respective specialised subset or a plurality of respective specialised subsets of said settable functional parameters, to define a respective specialised set or a plurality of respective specialised subsets of said processing mode, each of said specialised sets being related with a different cause of failure; and
   updating said working set with processing modes of said specialised set associated with the identified cause of failure.

19. The method according to claim 15, and comprising for each identified cause of failure storing statistical information on which processing mode in a given interval of time has obtained the greatest number of successful decoding occurrences and adding said processing mode with the greatest number of occurrences in said working set.

20. A method for decoding optical information present in an acquired image, and comprising:
   identifying a set of functional parameters that are settable for processing said image and a plurality of instances of said set of functional parameters, and in which each of said instances corresponds to a different processing mode for said image;
   selecting a processing mode for decoding said optical information from the processing modes of a working set of processing modes;
   applying said selected processing mode; and
   associating with each processing mode a respective probability of success;
   wherein said selecting a processing mode comprises:
      choosing the processing mode with a highest probability of success value;
      updating after said applying said selected processing mode, both if said decoding was successful and if said decoding was not successful, a probability of success of each processing mode of said working set, such as to provide adaptive decoding of said optical information,
   the method further comprising:
      decreasing the value of probability of success of said selected processing mode and increasing the probability of success of each non-selected processing mode of said working set, if said decoding said acquired image was not successful,
      if all the processing modes for said working set have been unsuccessful and said selected processing mode is a last of said decoding attempts by means of said working set, modifying said working set by analysing said failure of said decoding of said selected processing mode to identify a cause of failure of said decoding, and
      modifying said working set if a cause of failure of said decoding is identified,
   wherein a library set of processing modes for decoding said code corresponds to said plurality of instances, said library set being formed of a preset number of different processing modes, said preset number being greater than or the same as the number of processing modes of which said working set is formed, wherein said modifying said working set comprises choosing, in said library set, processing modes related with a solution of said cause of failure and further as a function of said selected determined processing mode and updating said working set with said processing modes related with said cause, and wherein said method further comprises associating a corresponding value of probability of success with each processing mode of said modified working set.

* * * * *